United States Patent [19]

Chamberlin

[11] Patent Number: 5,372,446
[45] Date of Patent: Dec. 13, 1994

[54] CAPTIVE BALL AND END CONNECTOR ASSEMBLY

[75] Inventor: James B. Chamberlin, Charlotte, N.C.

[73] Assignee: AVM, Inc., Marion, S.C.

[21] Appl. No.: 81,851

[22] Filed: Jun. 23, 1993

Related U.S. Application Data

[63] Continuation of Ser. No. 918,248, Jul. 23, 1992, abandoned.

[51] Int. Cl.⁵ .................................... F16C 11/00
[52] U.S. Cl. ........................ 403/122; 403/76; 403/144; 403/136
[58] Field of Search ............... 403/120, 122, 132, 135, 403/137, 144, 147, 141, 143, 326, 136, 138, 76, 77, 316, 20, 19

[56] References Cited

U.S. PATENT DOCUMENTS

| | | | |
|---|---|---|---|
| 2,010,367 | 8/1935 | Lapsley | 403/20 |
| 3,787,128 | 1/1974 | Maistrelli | 403/144 |
| 4,482,266 | 11/1984 | Kaneko | 403/135 |
| 4,568,216 | 2/1986 | Mizusawa et al. | 403/143 |
| 4,601,603 | 7/1986 | Nakayama | 403/326 X |
| 4,666,330 | 5/1987 | O'Connell | 403/141 |
| 4,768,895 | 9/1988 | Ludwig et al. | 403/19 X |
| 5,022,779 | 6/1991 | Schnitzler | 403/144 |

FOREIGN PATENT DOCUMENTS

| | | | |
|---|---|---|---|
| 713288 | 7/1965 | Canada | 403/141 |
| 222722 | 10/1924 | United Kingdom | 403/141 |

*Primary Examiner*—Randolph A. Reese
*Assistant Examiner*—Anthony Knight
*Attorney, Agent, or Firm*—McAndrews, Held & Malloy, Ltd.

[57] ABSTRACT

A captive ball and end connector assembly having a spring wire split, ball retaining ring positioned within the socket. The ball retaining ring is movable to an expanded position so as to enable the ball to be inserted through the ring. After the ball has been inserted, the ring then presses against the ball and a shoulder in the socket so as to hold the ball firmly in the socket. The ball shaft may be inserted into the socket so that its threaded end may selectively project from the socket in either one of two directions. The ball retaining ring may be returned to its expanded position, whereby the ball may be removed from the socket, by the use of a tool manipulated from without the socket.

15 Claims, 4 Drawing Sheets

CAPTIVE BALL AND END CONNECTOR ASSEMBLY

This is a continuation of application Ser. No. 07/918,248, filed Jul. 23, 1992 now abandoned.

BACKGROUND OF THE INVENTION

The present invention relates to captive ball and end connector assemblies, and more particularly, to captive ball and stud end connector assemblies adapted for mounting the ends of gas springs on, for example, automotive hatch back doors and the adjacent parts of the automobile passenger compartment.

Captive ball and end connector assemblies have been used for years in many applications. Such assemblies—comprising a shaft with a ball at one end and an end connector with a socket for receiving the ball—are used to mechanically interconnect relatively movable parts High strength and a high retention force (that is, the force required to pull a ball out of its socket) are particularly desirable features of a captive ball and connector assembly when the assembly is used inside the passenger compartment of an automobile. Otherwise if the ball were to come out of or be pulled out of the socket, as for instance during an accident, the shaft might cause injury to occupants of the automobile. High strength and high retention force captive ball and end connector assemblies have been, however, difficult to mass produce at a competitive cost.

Previously those working in this art have been seeking a relatively inexpensive captive ball and end connector assembly that not only had both high strength and a high retention force, but also could be easily and controllably disassembled and reassembled. The latter feature offers significant potential cost savings. If this shaft is inadvertently damaged prior to or during installation of the assembly, then the gas spring or any other part to which the assembly is attached, can still be salvaged.

Furthermore, captive ball and end connector assemblies utilized in automotive applications, and especially in the passenger compartments of automobiles, need to be relatively noise free during the operation of the automobile. Assemblies that "rattle" are unacceptable. Avoiding this noise problem has, in the past, increased the cost of the assemblies.

SUMMARY OF THE INVENTION

In principal aspects, the present invention permits the manufacture, at a quite competitive cost, of an improved high strength captive ball and end connector assembly that has a superior high retention force and that can be quickly and easily assembled, disassembled and re-assembled using a simple, inexpensive hand tool. The improved assembly of the present invention is particularly suited and adapted for use in mounting the ends of gas springs in automotive applications. As noted, it is important in such applications that the ball end of the shaft cannot be pulled unexpectedly out of the socket, as for example, during an automobile accident, because of the danger that the loose shaft might cause personal injury to passengers in the automobile.

Similarly, the enhanced ease of disassembly and reassembly is significant. It is likely that the captive ball and end connector assembly will be shipped to an automotive assembly plant connected to the gas spring. If by chance the assembly, for example, the threads on the shaft, should become damaged during shipment or while the gas spring is being mounted on an automobile, the damaged shaft is readily replaceable thereby avoiding having to scrap the much more expensive gas spring.

The improved assembly of the present invention affords other commercially significant advantages. Its shaft can be selectively extended out of either of the two opposite sides of the socket. This enables the improved assembly to be usable in a wider variety of applications. Additionally, the novel spring wire split ring used in the preferred embodiment of the invention to retain the ball in the socket also helps to provide an apparent zero clearance fit between the ball and the socket. This, in turn, prevents the "rattle" that usually would otherwise ordinarily occur and would surely be the subject of complaints from automobile owners.

Accordingly, it is a primary object of the present invention to provide an improved high retention force, high strength, easily controllably removable captive ball and end connector assembly. A related object of the present invention is to provide an improved captive ball and end connector assembly of the type described that is admirably suited and adapted for use in automotive applications such as the mounting of gas springs on automotive hatch back doors and adjacent parts of the automobile passenger compartment.

Another object of the present invention is to provide an improved captive ball and end connector assembly of the type described where the assembly includes a ball, on the first end of a shaft, having a preselected outer dimension; where the ball receiving socket in the connector has a first opening communicating with that socket, with the opening being larger than the ball so that the ball may be selectively inserted into and removed from the socket through the first opening in the connector's first side surface; where the socket also includes a first recess having an inner, generally spherical zone surface, with the radius of this inner spherical zone surface being selected such that the spherical surface of the ball is in substantial surface-to-surface contact with the inner spherical zone surface when the ball is mounted in the first recess and with the inner spherical zone surface being such that the dimension of the one end of that surface, adjacent to the first opening, permits the ball to be selectively removed from surface-to-surface contact with the inner spherical zone surface; where the socket also includes a second recess that, in turn, includes a first portion and a second portion, with the second recess being disposed adjacent to the first recess and between the first recess and the first opening, with the first portion of the second recess having an outer peripheral surface whose outer dimension is longer than the outer dimension of the ball and with the second portion of the second recess being adjacent to the first portion and having an outer peripheral surface whose outer dimension is longer than the outer dimension of the ball but is shorter than the outer dimension of the outer peripheral surface of the first portion; where a ball retaining member has a inner opening and an outer peripheral edge, with the ball retaining member being disposed within the second recess and being selectively movable between an expanded position where its inner opening is equal to that of the ball so that the ball can pass therethrough and a retaining or normal position where the outer dimension of its outer peripheral edge is slightly less than the outer dimension of the outer peripheral surface of the second portion and where its inner opening is smaller than the ball so that the ball retaining member, in its retaining position, bears against the inwardly projecting shoulder stop of the second portion and against the surface of the ball so as to retain the ball in the socket; where a third peripheral surface extends from the outer peripheral surface of the first portion to the outer peripheral surface of the second portion, with the third surface being sloped so that the ball retaining member can readily move along it between the first and second portions; and where the assembly includes means for permitting access to the ball retaining member from without the socket so that the ball retaining member may be selectively moved from its retaining position to an expanded position from without the socket.

Still another object of the present invention is to provide an improved captive ball and end connector assembly of the type described where the first and second portions of the second recess are first and second continuous annular grooves, respectively, with the second annular groove being disposed between the first annular groove and the first opening; where the ball retaining member is a spring wire split ring; where the ball retaining member is normally disposed in the second annular groove when the ball retaining member is in its retaining position; where the third peripheral surface is continuous and relatively smooth; and where the angle of the slope of the third peripheral surface is between 25 and 37 degrees with respect to the longitudinal axis of the socket. A related object of the present invention is to provide an improved captive ball and end connector assembly of the type described where the means for permitting access to the ball retaining member includes two diametrically opposed slots in the connector; where the longitudinal axes of these slots are parallel to the longitudinal axis of the socket; and where each slot extends from the first side surface of the connector to the plane of the first annular groove.

These and other objects and advantages of the present invention will become apparent from the following description of the preferred embodiment of the invention as illustrated in the drawings next described.

DESCRIPTION OF THE PREFERRED EMBODIMENT

Figures 1, 9, 10:
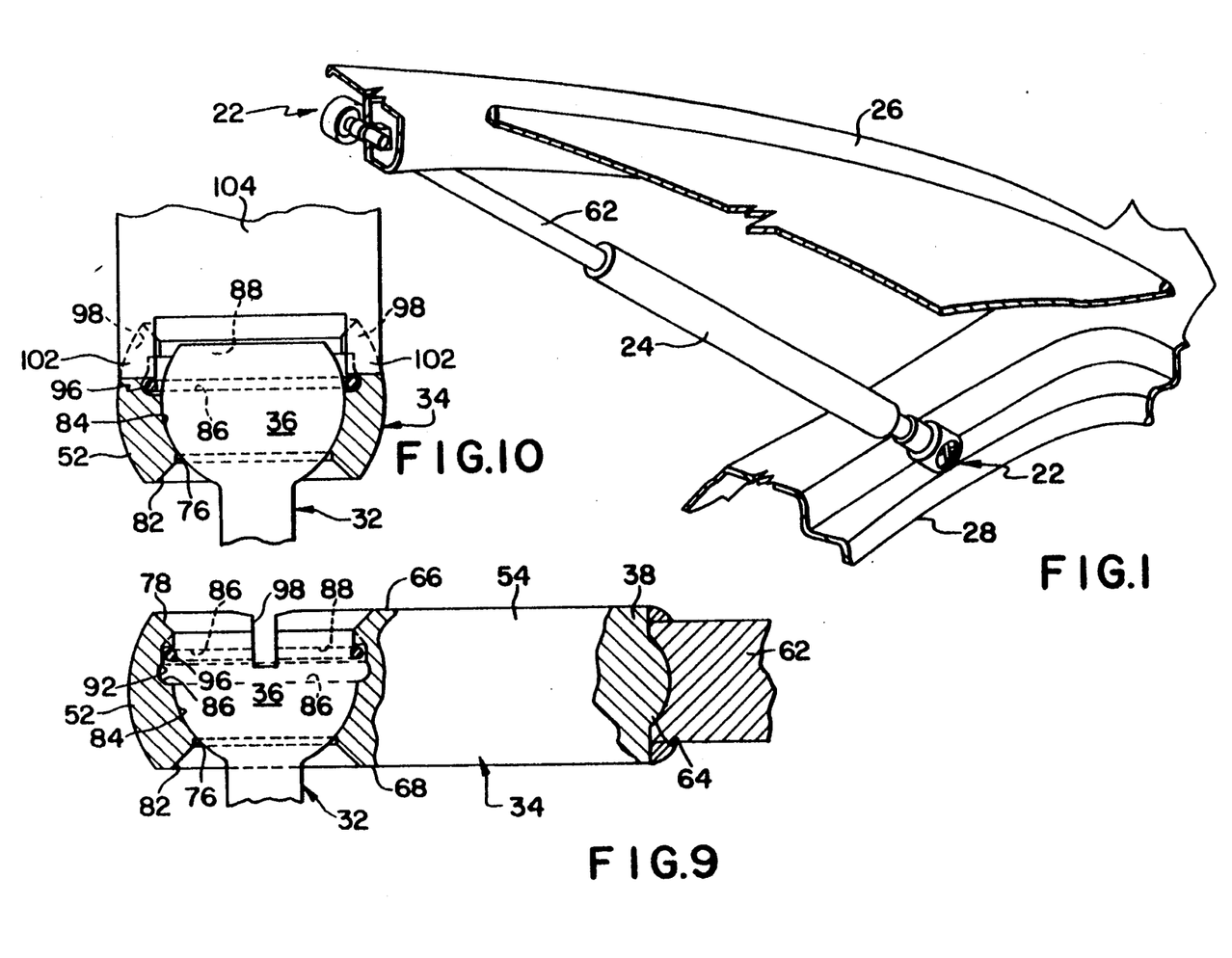
FIG. 1 is a partial perspective view showing improved captive ball and end connector assemblies of the present invention utilized to mount the ends of a gas spring between an automotive hatch back door and the adjacent part of the passenger compartment of the automobile.
FIG. 9 is a partial vertical cross-sectional view of the assembly of the present invention showing the captive ball mounted in the socket, with the ball retention ring in its retaining position.
FIG. 10 is a partial vertical cross-sectional view of the assembly of the present invention similar to that shown in FIG. 9 but showing a tool that is usable to engage the ball retention ring and that has moved the ring to its expanded position.

Referring now to FIGS. 1-8, the preferred embodiment of the improved high retention force, high strength, easily controllably removable captive ball and end connector assembly of the present invention is shown generally at 22. As illustrated in FIG. 1, two of these assemblies 22 may be used to mount the ends of a conventional gas spring 24 to a hatch back door 26 and to an adjacent part 28 of the passenger compartment of the automobile. This usage of these assemblies 22 permits relative movement to occur between the gas spring and the door 26 and between the gas spring and the part 28 as the door is opened and closed.

The captive ball and end connector assembly 22 includes a shaft 32 and a stud end connector 34. A generally spherical ball 36 is positioned at one end of the shaft 32. Its other end 38 is threaded as indicated at 42 in FIGS. 2-4. The central portion 44 of the shaft is generally cylindrical in shape and includes an elongated cylindrical supporting shoulder 45 adjacent to the base of the threads 42. This shoulder eliminates the risk of a bending failure at the root of the threads, when the assembly 22 is mounted on an automobile, and also provides a cosmetic, finished look to the final shaft. The diameter of the central portion 44 is greater than the diameter of the threads 42 but is less than the outer dimension (that is, the diameter) of the ball 36.

As best shown in FIGS. 2-4, 9 and 10, the ball 36 is not completely spherical in shape. The distal end of the ball 36 terminates in a flat end surface 46, the plane of which is generally perpendicular to the longitudinal central axis of the shaft 32.

Figures 2, 3:
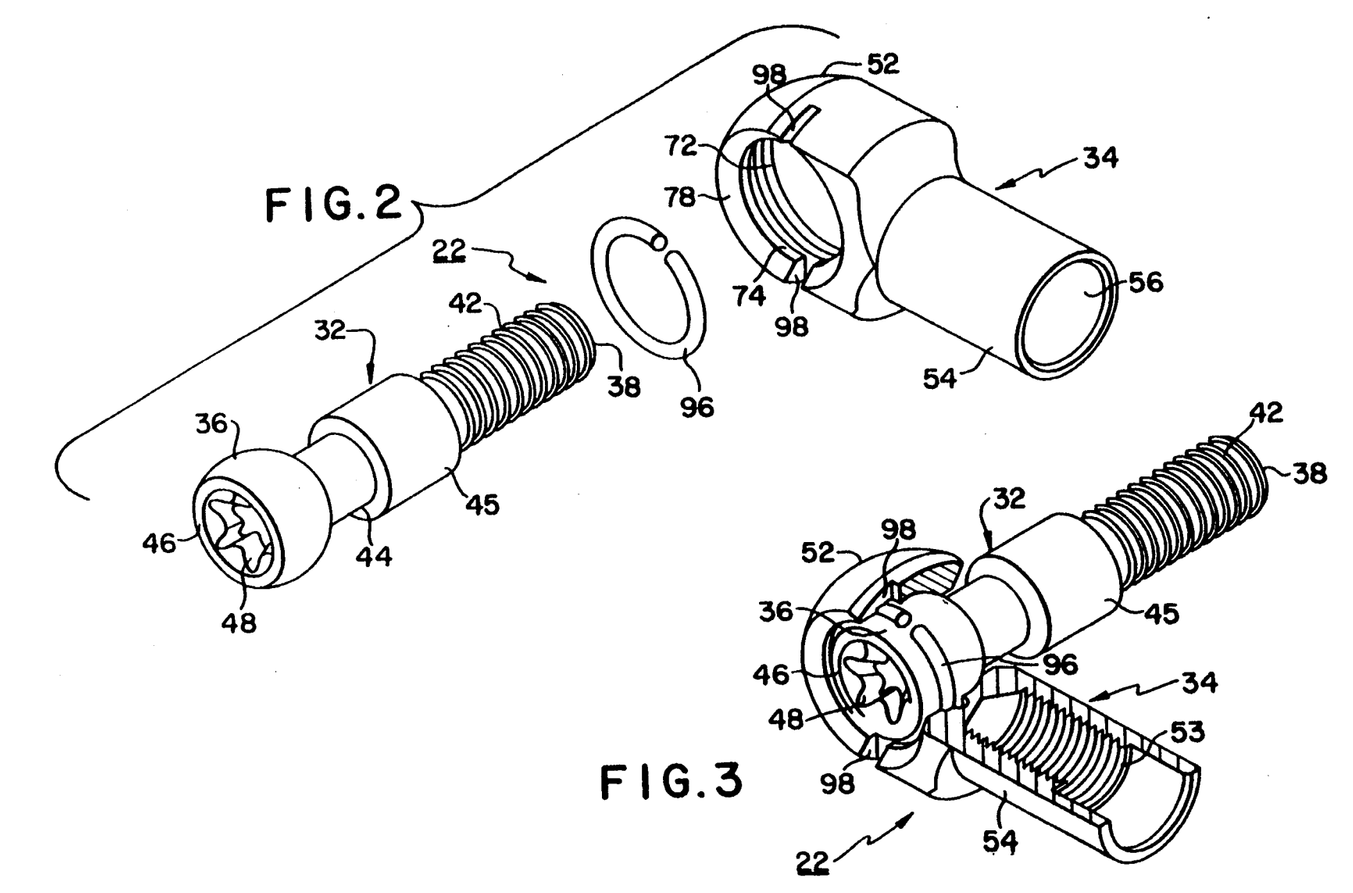
FIG. 2 is an exploded left hand perspective view of the preferred embodiment of the captive ball and end connector assembly of the present invention.
FIG. 3 is a partial cut-away view of the end connector and of the shaft of the assembly of the present invention.

The end surface 46 includes recess 48, as illustrated in FIGS. 2 and 3. The recess 48 is adapted to be engaged by a tool, not shown, so that turning the tool may cause the shaft 32 to be rotated about its central longitudinal axis. This facilitates the threading of the threads 42 into or out of a cooperating threaded mounting fitting.

Figures 4, 5, 6, 7, 8:
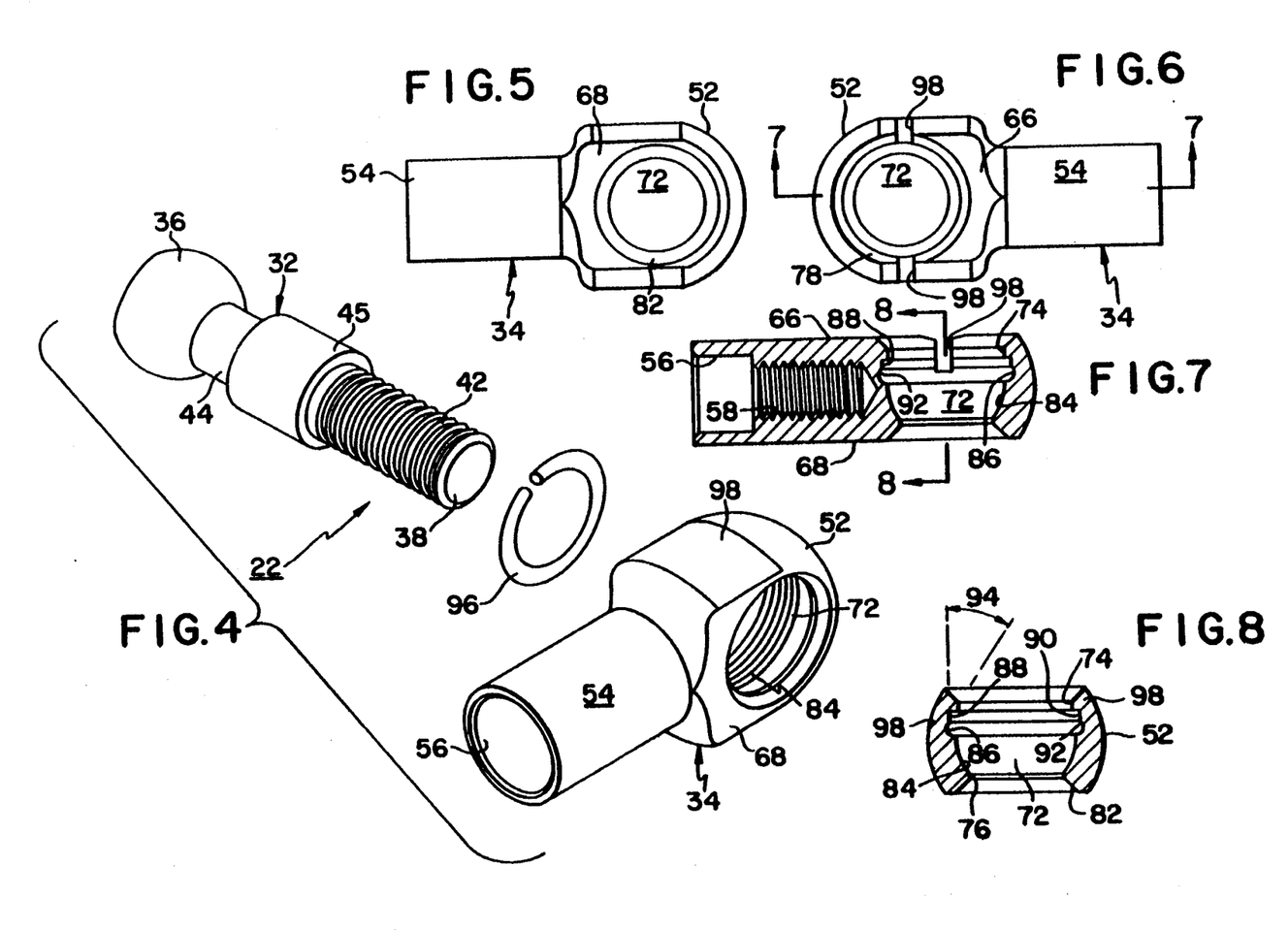
FIG. 4 is an exploded right hand perspective view of the assembly of the present invention.
FIG. 5 is a side elevational view of the end connector of the present invention.
FIG. 6 is a side elevational view of the opposite side of the end connector of the present invention.
FIG. 7 is a cross-sectional view taken along the line 7—7 in FIG. 6.
FIG. 8 is a cross-sectional view taken along the line 8—8 in FIG. 7.

The end connector 34 includes an enlarged end 52 and a shank 54 as best illustrated in FIGS. 2-8. The distal end of the shank 54 may include, as best shown in FIGS. 2 and 7, a recessed counterbore 56, the inner end which may be internally threaded as at 58. The threads 58 are sized so that the shank, and thus the connector 34 may be connected with the threaded end of the piston rod 62 of the gas spring 24. Alternatively, the distal end of the shank 54 may be solid, such as best shown in FIG. 9, and may include a protrusion 64 so as to facilitate the shank being welded, by resistance welding, to the end of the piston rod 62.

The enlarged end 52 of the end connector 34 includes two relatively flat side surfaces 66 and 68. The planes of these surfaces are substantially parallel to the longitudinal axis of the end connector 34 and to each other.

An internal socket 72 is centrally disposed within the end 52. A circular opening 74 in the side surface 66 permits access into the socket from without the end 52. Similarly, a circular opening 76 in the side surface 68 also permits access to the socket. The size of the opening 74 (that is, its diameter) is selected so that all of the shaft 32, including the ball 36, may readily pass through the opening. In contrast, the size of the opening 76, that is, its diameter, is selected so that only the other threaded end 38 and the central portion 44 of the shaft 32 may pass through the opening 76. In other words, the size of the opening 76 is selected so that the ball 36 cannot pass through that opening. The opening 76 is, however, large enough so that the recess 48 and the end surface 46 of the ball 36 is easily accessible through that opening when the ball is disposed in the socket. The portion of the enlarged end 52, defined by the differences in the outer dimensions of the ball 36 and the opening 76 provides strong resistance to the ball being pulled out of the socket "through" the opening 76.

To permit ease of ingress to the socket 72, and as best seen in FIGS. 7 and 8, the edges of the openings 74 and 76, adjacent to the side surfaces 66 and 68, are chamfered outwardly as indicated that 78 and 82, respectively.

The socket 72 itself includes two main parts or recesses. The first is a generally spherical inner zone surface 84 that is adjacent to the opening 76. One of the planes which defines the zone surface 84 is the plane of the opening 76. The radius of the spherical inner zone surface 84 is selected so that it is substantially equal to that of the spherical outer surface of the ball 36 so that when the ball 36 is disposed in the socket 72, there will be surface-to-surface contact between ball and the inner zone surface 84. More specifically the radius of the ball 36 and the surface 84 are selected so that there will be an apparent zero clearance fit between the ball and the surface.

The second plane, which defines the spherical zone surface 84, is adjacent to the central longitudinal axis of the socket. The size of the surface 84 in this second plane is sufficiently large so that the ball 36 may be readily introduced into and removed from surface-to-surface contact with the surface 84.

Figures 11, 12:
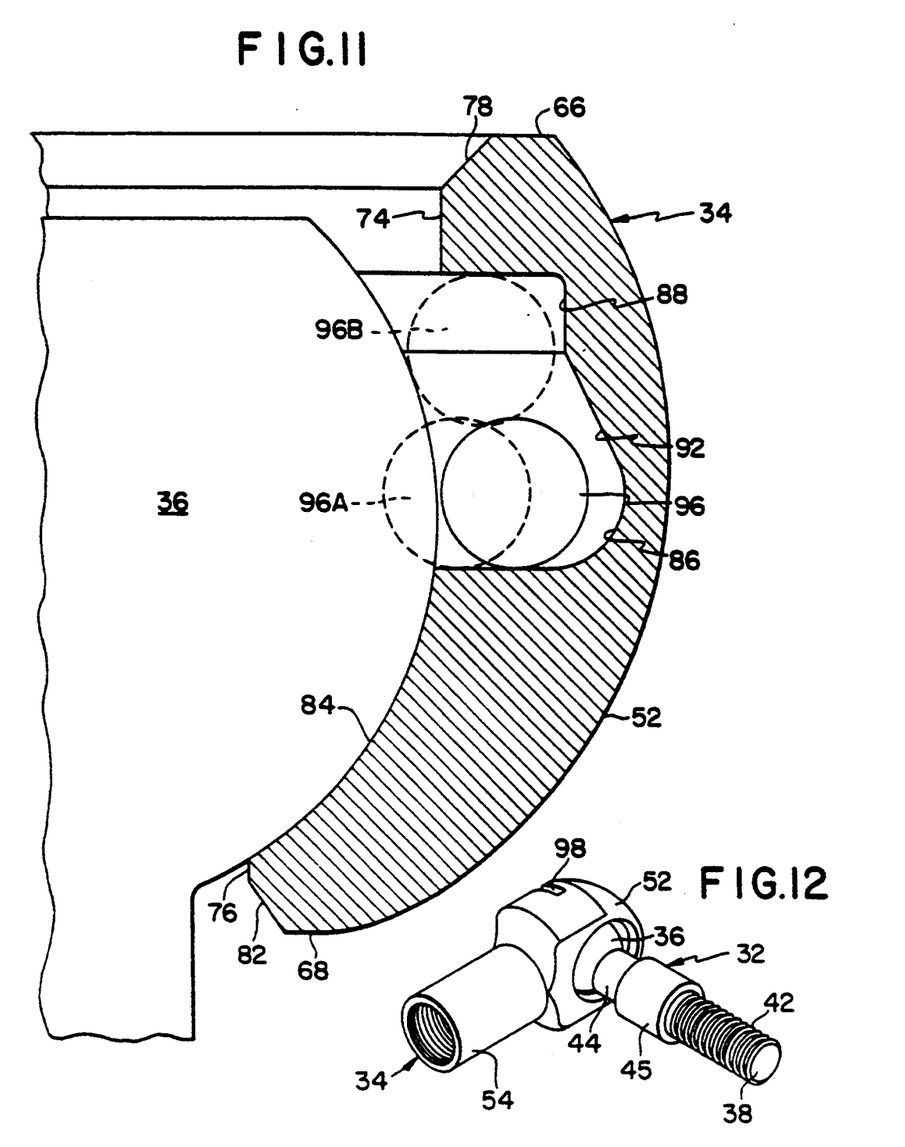
FIG. 11 is an enlarged, partial cross-sectional view of the ball, the ball retention ring and end connector and showing the various relationships between the ball and the retention ring.
FIG. 12 is a view generally similar to FIG. 3 and showing the ball shaft mounted, ball first, in the stud end connector.

The other part of the socket 72 includes first and second generally circular, continuous annular grooves 86 and 88, respectively. The outer peripheral surfaces of these grooves 86 and 88 are smooth. Like the center of the surface 84, the centers of the grooves 86 and 88 lie on the longitudinal central axis of the socket 72 (that is, the axis substantially perpendicular to the planes of the openings 74 and 76, and thus to the planes of the side surfaces 66 and 68). The second plane (that is, the plane which serves to define the inner zone surface 84) also serves to define the inner side of the first annular groove 86. The second annular groove 88 is disposed immediately adjacent to the first annular groove 86 and between that groove and the opening 74. As best illustrated in FIGS. 8 and 11, the groove 88 includes a stop shoulder 90 that is adjacent to the opening 74.

The radius of the outer peripheral surface of the first annular groove 86 is larger than the radius of the annular outer peripheral surface of the second groove 88. A smooth, substantially flat, annular surface 92 extends from and between the outer peripheral surfaces of the grooves 86 and 88. The surface 92 has a generally frustro conical shape, with the small end being adjacent to the opening 74. It is disposed at an angle, with respect to the longitudinal axis of the socket 72, with the angle being generally indicated at 94 in FIG. 8. This angle 94 is preferably between 25 and 37 degrees, and most preferably between 30 and 32 degrees.

A spring wire split ring 96 is disposed in the second part or recess of the socket 72. It is used to retain the ball 36 within the socket. The dimensions of the ring are selected so that the ring can be moved between: a retaining or normal position (best shown in FIGS. 9 and 11) where the dimension of its inner opening (that is, its I.D.) is less than the outer dimension of the ball 36 so that the ball cannot pass through its inner opening; and an expanded position (best shown in FIGS. 10 and 11) where its inner dimension is equal to the outer dimension of the ball 36 so that the ball can pass through the ring.

The radial dimension of the outer peripheral surface of the second annular groove 88 is selected so that when the ring is in its retaining position, its outer dimension (that is, its O.D.) is slightly less than the dimension of this groove's outer peripheral surface. Similarly when the ring 96 is in its expanded position, the ring can be disposed in the first annular groove 86 such that its outer dimension is somewhat less than that of the outer peripheral surface of the groove 86.

The spring wire ring 96 has an inner ring diameter, in the ring's free, unstressed state, that is less than the diameter of the ball 36. (The ring's unstressed position is indicated by 96A in FIG. 11.) As the ball 36 is assembled into the end connector 34, and passes into and through the ring 96, the stresses developed in the material of the ring tend to urge the ring to assume its smaller, original, unstressed diameter. To do so, the expanded ring 96, which has accepted the major diameter of the ball 36, must slide upwardly over the hall's spherical surface to ball retaining positions of ever decreasing diameters until, as shown at 96 B in FIG. 11, the ring contacts the stop shoulder 90. The action of the ring 96, bearing against the spherical surface of the ball 36 (which is seated in the surface 84) and also bearing against the shoulder 90—coupled with the apparent zero clearance fit between the ball and the surface 84— eliminate the rattle or other noise that might otherwise be expected to occur in a loose assembly. As noted, such a rattle or noise would be objectionable to passengers in the passenger compartment of an automobile, one of the intended uses of the assembly 22. This action of the ring 96 and the close friction fit between the ball 36 and socket 72 also tends to dampen unwanted rotary motion between the ball and the socket.

The peripheral surface 92, as noted, is relatively smooth such that the ring 96 is able to move or slide between the two grooves 86 and 88 easily as the ring is expanded or contracted between its expanded and retaining positions. The angle of the surface 92 is selected so that when the ring 96 moves between the two grooves, it will do so in a plane substantially perpendicular to the longitudinal axis of the socket 72. In other words, by the inclusion of the annular, axial surface of the groove 88 and the surface 92, helical/wobble motion of the shaft 32, relative to the socket, will not destabilize the ring position so as to allow the ball and ring to separate under the load.

To facilitate assembly, disassembly and reassembly of the captive ball and stud end connector assembly 22, two diametrically opposed, identically sized slots 98 are cut or formed in the enlarged end 52 adjacent to the side edge of the opening 74. These slots extend from the side surface 66 to within the first annular groove 86. Their longitudinal axes are parallel to the longitudinal axis of the socket 72. The widths of the slot 98 are selected so that the two bifurcated ends 102 of a tool 104, the lower portion of which is generally shown in FIG. 10, may be received within the slots. Pushing the tool ends 102 longitudinally into the slots (that is, parallel to the longitudinal axes of the slots) causes the ends 102 to engage the split wire ring 96 when it is in the second groove, and to force the ring into an expanded position in the first annular groove 86. The tool 104 may include either a straight or bent handle, not shown, so as to facilitate its use.

As it is apparent from the foregoing, the assembly 22 of the present invention represents a significant improvement over prior captive ball and end connection assemblies. When the assembly 22 is made from steel, its strength is exceptional. The assembly 22 permits the shaft 32 to be positioned in either two ways, vis-a-vis the end connector 34. Specifically, the shaft 32 can be inserted, end 38 first, into the opening 74 so that the end 38 extends out through the opening 76. In this way, the recess 48 in the end surface 46 is accessible through the opening 74. When thus installed, the assembly 22 has an extremely high retention force, typically 45,000 newtons, while still allowing for the facile separation of the shaft 32 and connector 34 by the use of the tool 104. Alternatively and as shown in FIG. 12, the shaft 32 can be introduced, ball 36 first, into the socket 72 through the opening 74 so that the end 38 of the shaft extends out of the socket through the opening 74 and so that the recess 48 is accessible through the opening 76. When installed in this more conventional mode, the assembly 22 still exhibits a relatively high retention force, typically 10,000 newtons, while still allowing for easy assembly and disassembly of the assembly 22.

Typical and representative dimensions of the captive ball and end connector assembly 22 are as follows: the outer diameter of the end 52 (that is, of the curved walls between the surfaces 66 and 68) is 0.844 inches; the diameter of the opening 74 is 0.578 inches; the diameter of the outer periphery of the first groove 86 is 0.691 inches; the diameter of the outer periphery of the groove 88 is 0.650 inches; the diameter of the opening 76 is 0.474–0.471 inches, the angle of the chamfered edges 78 and 82 is 45 degrees, with respect to the longitudinal central axis of the socket; the inner diameter of the ring 96 is 0.350 inches before the ball is inserted through it; and the diameter of the wire, itself, which comprises the ring 96, is 0.047 inches.

As it will be apparent to those skilled in this art, modifications could be made to the above described preferred embodiment and still be within the scope of the present invention. Thus it is to be understood that the appended claims, and not the foregoing description of the preferred embodiment, particularly pointed out and distinctly described what the inventor regards as to be his invention.

I claim:

1. An improved high retention force, high strength, easily controllably removable captive ball and end connector assembly comprising:

a shaft including a first end and having a longitudinal central axis;

a ball on the first end of the shaft, the ball including an outer, generally spherical zone surface defined by and between a first plane and a second plane and having a preselected radius;

an end connector including a first surface, a second surface and a ball receiving socket that has a longitudinal axis, with the first and second surfaces being substantially perpendicular to the longitudinal axis of the socket and being on opposite sides of the socket, the connector including (a) a first opening in its first surface, which opening communicates with the socket, and with the first opening being larger than the ball so that the ball may be selectively inserted into and removed from the socket through the first opening, and (b) a second opening in its second surface, which opening communicates with the socket, with the second opening being smaller than the ball but larger than the shaft so that the shaft may extend selectively out of one of the first and second openings when the ball is inserted into the socket through the first opening;

the socket including a first recess having an inner, generally spherical zone surface defined between a third plane and a fourth plane, with the radius of the inner spherical zone surface being selected so that the outer spherical zone surface of the ball is in substantial surface-to-surface contact with the inner spherical zone surface when the ball is mounted in the first recess and so that the dimensions of the inner spherical zone surface, in the third plane, permit the ball to be selectively removed from surface-to-surface contact with the inner spherical zone surface;

the socket also including a second recess disposed adjacent to the third plane and between the third plane and the first opening, the second recess including a first annular groove and a second annular groove, with the first groove being adjacent to the third plane and having an outer peripheral surface whose radius is longer than the preselected radius of the ball and with the second groove being adjacent to the first groove and having an outer peripheral surface whose radius is longer than the radius of the ball but is shorter than the outer radius of the outer peripheral surface of the first groove and also having an inwardly extending shoulder adjacent to the first opening;

a ball retaining ring disposed within the second recess, the ring being selectively movable between an expanded position, in the first groove, where the length of its inner expanded radius is equal to the radius of the ball so that the ball can pass therethrough and a retaining position where its outer radius is substantially equal to but less than the radius of the outer peripheral surface of the second groove and where the length of its inner radius is less than the length of the radius of the ball so that the ring, in its retaining position, bears against the ball and against the inwardly extending shoulder so as to retain the ball in the socket;

the second recess also including a third peripheral surface that extends from the outer peripheral surface of the first groove to the outer peripheral surface of the second groove, the third surface being sloped, so that ring can move, with a minimum of fictional resistance and while remaining in plane substantially perpendicular to the longitudinal axis of the socket, along the third surface between the first and second grooves; and means for permitting access to the ball retaining ring from without the socket so that the ball retaining ring may be moved from its retaining position to its expanded position from without the connector.

2. The improved captive ball and end connector of claim 1 wherein the ball retaining ring is a spring wire split ring; wherein the center of the ball is aligned with the longitudinal central axis of the shaft; wherein the centers of the first opening, the first groove and the second groove are aligned with the longitudinal axis of the socket; and wherein the first and second grooves are continuous.

3. The improved captive ball and end connector assembly of claim 1 wherein the second annular groove is between the first groove and the first opening; wherein the ball retaining ring is normally disposed in the second groove when the ring is in its retaining position; and wherein the angle of the slope of the third surface is between 25 and 37 degrees with respect to the longitudinal axis of the socket.

4. The improved captive ball and end connector assembly of claim 3 wherein the first and second grooves are continuous; wherein third surface is continuous and relatively smooth; and wherein the angle of the slope of the third surface is between 30 and 32 degrees.

5. The improved captive ball and end connector assembly of claim 3 wherein the ball retaining ring is a spring wire split ring; wherein the center of the ball is aligned with the longitudinal central axis of the shaft; wherein the centers of the first opening, the first groove and the second groove are aligned with the longitudinal axis of the socket; and wherein the first and second grooves are continuous; wherein the connector includes means for permitting access to the ball retaining ring so that the ball retaining ring may be moved from its retaining position to its expanded position from without the connector.

6. The improved captive ball and end connector assembly of claim 5 wherein third surface is continuous and relatively smooth; and wherein the angle of the slope of the third surface is between 30 and 32 degrees with respect to the longitudinal axis of the socket.

7. The improved captive ball and end connector assembly of claim 6 wherein the first and second planes of the outer spherical zone surface of the ball are generally perpendicular to the longitudinal axis of the shaft; wherein the first plane is adjacent to the shaft; wherein the second plane also defines a flattened surface on the ball; wherein the flattened surface includes means for engaging the shaft so that the shaft, may be rotated about its longitudinal axis; and wherein the engagement means is accessible through the adjacent opening in the connector side surface.

8. The improved captive ball and end connector assembly of claim 1 wherein the access means includes two diametrically opposed slots in the connector, wherein the longitudinal axes of the slots are parallel to the longitudinal axis of the socket; and wherein each slot extends from the first surface of the connector to the plane of the first groove.

9. The improved captive ball and end connector assembly of claim 1 wherein the first and second planes of the outer spherical zone surface of the ball are generally perpendicular to the longitudinal axis of the shaft; wherein the first plane is adjacent to the shaft; wherein the second plane also defines a surface on the ball; wherein the flattened surface includes means for engaging the ball so that the shaft, may be rotated about its longitudinal axis; and wherein the flattened surface is accessible through the adjacent opening in the connector side surface.

10. An improved high retention force, high strength, easily controlled removable captive ball and end connector assembly comprising:

a shaft including a longitudinal axis and a first end;

a ball on the first end of the shaft, the ball including, at least in part, an outer, generally spherical surface and having a preselected outer dimension;

a connector including a ball receiving socket having a longitudinal axis and a first opening therein communicating with the socket, with the opening being larger than the ball so that the ball may be selectively inserted into and removed from the socket through the first opening., with the first end of the shaft defining a shaft end surface that is generally perpendicular to the longitudinal axis of the shaft, the shaft end surface including means for engaging the shaft so that the shaft may be rotated about its longitudinal axis, the engagement means being accessible through an opening in the connector when the ball is in the socket;

the socket including a first recess having an inner, generally spherical zone surface, with the radius of the inner spherical zone surface being selected so that the outer spherical surface of the ball is in substantial surface-to-surface contact with the inner spherical zone surface when the ball is mounted in the first recess and with the inner spherical zone surface being constructed so that the dimensions of the end of the inner spherical zone surface, adjacent to the first opening, permit the ball to be selectively removed from surface-to-surface contact with the inner spherical zone surface;

the socket also including a second recess that, in turn, includes a first portion and a second portion, the second recess being disposed adjacent to the first recess and between the first recess and the first opening, with the first portion having an outer peripheral surface whose outer dimension is longer than the outer dimension of the ball, and with the second portion being adjacent to the first portion, and having an outer peripheral surface whose outer dimension is longer than the outer dimension of the ball but is shorter than the outer dimension of the outer peripheral surface of the first portion and also having a shoulder adjacent to the first opening;

a ball retaining member having an inner opening and an outer peripheral edge, the ball retaining member being disposed within the second recess and being selectively movable between an expanded position where its inner opening is equal to the ball so that the ball can pass therethrough, and a retaining position where the outer dimension of its outer peripheral edge is substantially equal to but less than the outer dimension the outer peripheral surface of the second portion and where its inner opening is smaller than the ball so that the ball retaining member, in its retaining position, retains the ball in the socket;

a third peripheral surface extending from the outer peripheral surface of the first portion to the outer peripheral surface of the second portion, the third surface being sloped so that the ball retaining member can readily move and while remaining in plane substantially perpendicular to the longitudinal axis of the socket, along the third surface between the first and second portions; and means for permitting access to the ball retaining member from without the socket so that the ball retaining member may be selectively moved from its retaining position to its expanded position from without the socket.

11. The improved captive ball and end connector assembly of claim 10 wherein the second portion is between the first portion and the first opening; wherein the shapes of the outer peripheral surfaces of the first and second portions are congruent; wherein the shape of the ball retaining member is generally congruent to the shapes of the first and second portions; and wherein the ball retaining member is normally disposed in the second portion when the ball retaining member is in its retaining position.

12. The improved captive ball and end connector assembly of claim 11 wherein the first and second portions are planar and are generally annular in shape; wherein the planes of the first and second portions are generally perpendicular to the longitudinal axis of the socket; and wherein the angle, with respect to the longitudinal axis of the socket, of the slope of the third surface is between 25 and 37 degrees.

13. The improved captive ball and end connector of claim 12 wherein the outer peripheral surfaces of the first and second portions are continuous; wherein the third surface is continuous; and wherein the angle of the slope of the third surface is between 30 and 32 degrees.

14. The improved captive ball and end connector of claim 13 wherein the access means includes at least one slot in the connector; wherein the longitudinal axis of the slot is substantially parallel to the longitudinal axis of the socket; and wherein the slot extends from the plane of the first opening to the first portion of the second recess.

15. The improved captive ball and end connector of claim 10 wherein the access means includes at least one slot in the connector; wherein the longitudinal axis of the slot is substantially parallel to the longitudinal axis of the socket; and wherein the slot extends from the plane of the first opening to the first portion of the second recess.

* * * * *

UNITED STATES PATENT AND TRADEMARK OFFICE
CERTIFICATE OF CORRECTION

PATENT NO.   :   5,372,446
DATED        :   December 13, 1994
INVENTOR(S)  :   James B. Chamberlin It is certified that errors appear in the above-identified patent and that said Letters Patent is hereby corrected as shown below:

Column 3, Line 47, the word "the" should be inserted after the word "showing."

Column 6, Line 40, the word "halls" should be "ball's."

Column 6, Line 43,

Column 9, Line 1, the word "a" should be inserted before the word "plane."

Column 9, Line 26, the word "the" should be inserted before the word "third."

Column 9, Line 42, the word "the" should be inserted before the word "third."

IN THE DRAWINGS:

The number "90" should be added as shown in Fig. 11 to conform to Column 6, Line 43 in the text.

Signed and Sealed this

Twenty-third Day of May, 1995

Attest:

BRUCE LEHMAN

*Attesting Officer*      *Commissioner of Patents and Trademarks*